March 25, 1958 J. A. GREEFKES ET AL 2,828,415

SYNCHRONIZED GATE HAVING STARTING AND HOLDING MEANS FOR LOCAL SYNCHRONIZING SIGNAL SOURCE

Filed April 1, 1953 3 Sheets-Sheet 1

INVENTORS
JOHANNES ANTON GREEFKES
FRANK DE JAGER
BY
[signature]
AGENT

INVENTORS
JOHANNES ANTON GREEFKES
FRANK DE JAGER
BY
AGENT

INVENTORS
JOHANNES ANTON GREEFKES
FRANK DE JAGER
BY
Fred M. Vogel
AGENT

United States Patent Office 2,828,415
Patented Mar. 25, 1958

2,828,415

SYNCHRONIZED GATE HAVING STARTING AND HOLDING MEANS FOR LOCAL SYNCHRONIZING SIGNAL SOURCE

Johannes Anton Greefkes and Frank de Jager, Eindhoven, Netherlands, assignors, by mesne assignments, to North American Philips Company, Inc., New York, N. Y., a corporation of Delaware Application April 1, 1953, Serial No. 346,096

Claims priority, application Netherlands April 19, 1952

19 Claims. (Cl. 250—27)

This invention relates to pulse receivers comprising a pulse selector for separating pulses of constant repetition frequency from a series of successive pulses. The invention relates more particularly to a pulse code-modulation receiver comprising a synchronisation pulse selector for separating synchronising pulses and signal pulses which are present and absent in an alternation which is dependent upon the signals to be transmitted.

Signals may be transmitted by pulse code-modulation in different ways.

Radio transmitters for the transmission of speech signals by pulse code-modulation with the use of, for example, a binary five-unit code are already known, in which 32 different amplitude levels can be transmitted. The transmitted signal is scanned at equidistant moments with a repetition frequency (signal frequency), which is equal to about twice the highest signal frequency to be transmitted and which is, for example, 8 kcs./sec. at a maximum signal frequency of 3.4 kcs./sec. Instead of the instantaneous values of the signal occurring at the moments of scanning, the most adjacent amplitude level of the 32 amplitude levels that can be transmitted is transmitted in a particular manner, since the level to be transmitted is coded in a code pulse-group modulator, that is to say when use is made of a five-unit code, a code pulse-group is generated and transmitted which characterises the level concerned and which is constituted by at the most five equal and equidistant pulses. The presence or absence of one or a plurality of pulses of a code pulse-group characterises the amplitude level and hence approximately the instantaneous value of the signal.

In addition to the above-mentioned transmitters for pulse code-modulation, transmitters comprising pulse code-modulators have previously been suggested, which are based on analogous principles and in which the signals to be transmitted control, by way of a difference producer, a pulse modulator which is connected to a generator for equidistant pulses, the pulse modulator being bridged by a return circuit comprising a pulse code-demodulator and subsequently the series-combination of a network integrating signal frequencies and the difference producer which is also controlled by the signals to be transmitted. A return voltage is set up at the difference producer, which voltage is a quantitative approximation of the signal to be transmitted and, as seen in a time diagram, oscillates about the input signal. A positive or negative difference voltage, according to the instantaneous value of the signal to be transmitted, occurs in the output circuit of the difference producer. Under control of the polarity of the said difference voltage or a voltage derived therefrom, the pulses provided by the pulse generator are either transmitted to the output circuit of the pulse code-modulator or suppressed by the pulse modulator (U. S. Patent No. 2,662,118).

The said pulse code-modulators with return circuit may alternatively be so constructed (U. S. Patent No.

2,662,113) that the quantised instantaneous value of the difference voltage or a voltage derived therefrom (U. S. Patent No. 2,745,063) is characterised by means of a pulse-group code which is preferably of the binary type.

When pulse code-modulation transmitters of the kind described are used for time-multiplex transmission of a plurality of signals, or if a single speech signal is transmitted with the use of a multi-unit code, accurate synchronism between the transmitter and the receivers co-operating therewith is required.

Thus in the transmission, by means of the said known transmitters, of a plurality of signals in time-multiplex with the use of a multi-unit code, it is known to transmit a synchronising pulse during each second signal cycle and to suppress this pulse in the intermediate signal cycles. Each signal cycle in this case comprises a synchronisation interval and a plurality of signal intervals which occur in cyclic sequence and which are equal in number to the maximum number of signal pulses to be transmitted per signal cycle, that is to say five signal intervals if a single speech signal is transmitted with the use of a five-unit code and 5 $n$ signal intervals upon simultaneous transmission of $n$-speech signals in time-multiplex each with the use of a five-unit code.

In the last-mentioned transmission in time-multiplex it is known at the receiving end to find the synchronising pulses (repetition frequency, for example, 4 kcs./sec.) and to separate them from the signal pulses with the use of a separating device comprising an oscillatory circuit tuned to the repetition frequency (4 kcs./sec.) of the synchronising pulses and a preceding gate circuit which is released in the rhythm of the signal-cycle period (8 kcs./sec.) for a duration corresponding to a signal interval. The synchronisation intervals are evident from that, after some cycles of the repetition frequency of the synchronising pulses, a voltage of this repetition frequency strongly occurs in the oscillatory circuit, which voltage may be used for controlling the synchronisation of the receiver. If the 4 kc.-component does not occur or occurs with insufficient strength, the subsequent intervals must be scanned automatically and in succession for synchronising pulses until a 4 kc.-component occurring with sufficient strength in an interval indicates that the synchronisation interval is reached.

In the transmission of signals with the use of pulse code-modulators comprising a return circuit, it is also possible for a synchronising pulse to be transmitted during each second signal cycle, in order to ensure synchronism between transmitter and receiver. However, this may lead to practical disadvantages. For example, in pulse code-modulators with return circuit for time-multiplex transmission of a plurality of signals with the use of a one-unit code, in the absence of a speech signal and hence, for example, in a speech interval, the half signal-cycle frequency may be strongly represented in the series of pulses transmitted in corresponding signal intervals. The synchronisation of the receiver could respond thereto as if this speech signal were the synchronising signal.

In order to mitigate the said practical disadvantages, it has previously been suggested that a synchronising pulse should be transmitted in a synchonisation interval of each signal cycle (U. S. Patent No. 2,760,003).

At the receiving end, the synchronising pulses present in each synchronisation period may rapidly be found and separated from the signal pulses by the use of a pulse selector (U. S. Serial No. 221,022, filed April 14, 1951, now abandoned), constituted by a relaxation generator which is controlled by the incoming pulses and which becomes insensitive, upon response to a pulse, for a period which is smaller than a synchronisation cycle and greater than a synchronisation cycle decreased by a signal interval. If the pulse selector does not respond in a determined interval, the circuit scans automatically and in succession the subsequent intervals for synchronising pulses, the scanning process consisting in that the pulse selector in the absence of a signal pulse associated with a given signal interval responds to the first pulse present after this signal interval. This position is maintained until a synchronising pulse excites the relaxation generator, whereafter the relaxation generator is synchronised on the desired cycle frequency due to the continuous presence of the synchronising pulses.

This pulse selector may advantageously be used (U. S. Patent No. 2,798,118) at the receiving end of a pulse code-modulation system in which the synchronisation intervals have a duration corresponding to two signal intervals and each signal cycle and a synchronising pulse is transmitted in each signal cycle only in a determined half of the synchronisation interval, preferably the latter half thereof. At the receiving end, pulses corresponding to the incoming pulses and having a duration equal to at least the signal intervals are supplied by way of a differentiating network to a synchronising pulse selector. Considering that, as a result of the pulse widening and the subsequent differentiation, as a rule fewer pulses are supplied to the pulse selector than individual pulses are transmitted, it will be evident that the synchronising pulses can thus be found more rapidly.

The object of the present invention is to provide a pulse receiver comprising a particularly advantageous pulse selector for selection of periodically-occurring pulses of constant repetition frequency, which may advantageously be used for reception by pulse code-modulation.

The pulse selector according to the invention comprises a mixing stage (coincidence mixing stage) which, normally, is cut off and which is controlled by the incoming pulses and furthermore by output pulses of a return circuit connected to the output of the mixing stage and comprising a retarding network, whilst furthermore a starting circuit is provided for the initial supply of incoming pulses to the return circuit.

When this new pulse selector is used, a minimum scanning time is realised, since the testing of intervals one after another such as in known selector circuits is avoided. Thus, when using the selector for pulse code-modulation, all time intervals, including the synchronisation interval, which occur in a period corresponding to the interval between two successive synchronising pulses, are simultaneously tested for the continuous presence of a pulse, so that this selector is termed "simultaneous selector."

The retardation time of the retarding network in the return circuit is preferably equal to one cycle of the repetition frequency of the pulses to be selected. However, it may alternatively be equal to a whole multiple of this cycle.

The starting circuit preferably comprises a starting tube which is included between the input of the pulse selector and the input of the retarding network provided in the return circuit, and furthermore comprises a control circuit which is connected to the return circuit and which responds with retardation to the incoming pulses.

In the foregoing reference is made to the particularly short finding time of the simultaneous selector. As soon as a pulse to be selected is missing in the incoming pulses as a result of, for example, atmospheric interference, further pulses to be selected which are present would be blocked by the selector, if no particular steps were taken.

The starting circuit of the simultaneous selector may (automatically) again be made operative for finding the pulses to be selected, but this is frequently undesirable despite the extremely short finding time.

Such renewed starting and finding after one or a plurality of pulses to be selected fall out due to interference, substantially may be avoided by the use of a so-called holding circuit comprising a retarding network which, after the desired selection of the pulses is carried out, is connected between two points in the return circuit by means of a switching relay to an energising circuit which is coupled to the return circuit.

In order that the invention may be readily carried into effect, it will now be described with reference to the accompanying drawings showing, by way of example, some embodiments thereof.

Fig. 1 is a block diagram of a pulse receiver comprising five signal channels and one synchronisation channel for reception of signals transmitted by pulse code-modulation and time-multiplex.

Figure 1:
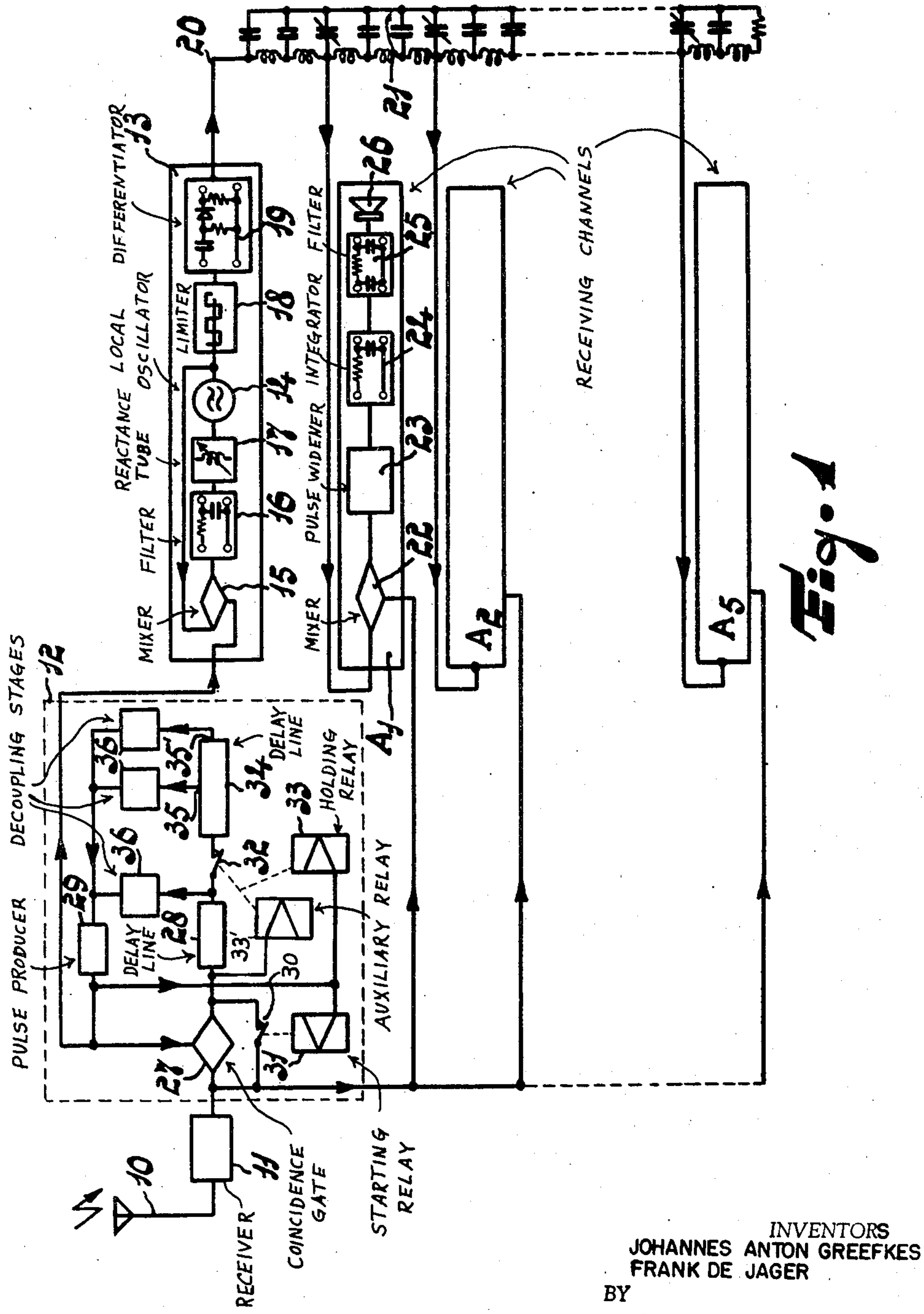
Fig. 1 shows in block diagram a time-multiplex receiver for pulse code-modulation according to the invention.

In the receiver shown in Fig. 1 the pulses received by an aerial 10 are supplied to an amplifying stage 11, which comprises in succession, for example, a high-frequency amplifier, a mixing stage, an intermediate-frequency amplifier, an amplitude detector and a pulse producer. The pulse producer may be constituted, for example, by an amplitude limiting- and threshold device and a pulse regenerator or similar device.

Fig. 2*a* shows, in a time diagram, the pulses derived from the amplifying stage 11 for a duration corresponding to 5 cycle periods $T_1$ to $T_5$. Each cycle period is subdivided into 6 intervals of same length, the first signal interval being intended for the synchronising pulses $P_{01}$ to $P_{06}$ and the other intervals being intended for the signal pulses associated with the 5 different signal channels.

In this figure five pulses associated with the third signal channel are designated $P_{31}$ to $P_{35}$. It is to be noted that the pulses $P_{32}$ and $P_{33}$ are suppressed and hence indicated only by dotted lines. The presence and absence of the signal pulses associated with the other signal channels are shown in a similar manner.

There is no difference between the signal pulses and the synchronising pulses in regard to duration, amplitude and form. The synchronising pulses are distinguished from the signal pulses in that they are, without exception, present in each cycle period in the time interval intended for them.

In the pulse series shown, all pulses transmitted coincide with pulses from a series of equidistant pulses. The repetition frequency of the synchronising pulses and also the cycle frequency are, for example, 50 kcs./sec. and the duration of the pulses is about 0.7 $\mu$sec.

The signal pulses and synchronising pulses derived from the amplifying stage 11 are supplied to a synchronisation-pulse selector indicated by 12 in block diagram, which pulse selector will be referred to hereinafter. The selected synchronising pulses occur at the output of the synchronisation-pulse selector, but the moments of occurrence, as a result of interference, are not such that the pulses are equidistant. In order to avoid this disadvntage, which is responsible for the occurrence of noise in the incoming signals, the selected synchronising pulses are supplied to a synchronisation-pulse regenerator or to an anti-noise device 13.

Of anti-noise device 13 the block diagram only is shown in Fig. 1. A possible detail construction has previously been suggested (U. S. Patent No. 2,662,118) so that it suffices here to explain the block diagram.

The anti-noise device 13 comprises a local oscillator 14, which provides a sinusoidal oscillation and which is tuned to a frequency substantially corresponding to the repetition frequency of the incoming synchronising pulses. The sinusoidal oscillation of oscillator 14 is supplied, together with the synchronising pulses occurring at the output of synchronisation-pulse selector 12, to a phase detector constituted by a mixing stage 15. In the output circuit thereof a direct control voltage occurs, which is dependent upon the phase of the synchronising pulses with respect to the sinusoidal oscillation. This direct control voltage, after being smoothed by means of a low-pass filter 16, controls a reactance tube 17, which is coupled to the frequency-determining circuit of oscillator 14. The frequency and the phase of local oscillator 14 are thus automatically stabilised on the repetition frequency of the synchronising pulses. The synchronising pulses supplied to regenerator 13 exhibit material variations in phase, whereas such variations in phase do not occur or at least occur in greatly attenuated form in the sinusoidal output voltage of oscillator 14, provided that the time-constant of the smoothing filter 16 is sufficiently great and, for example, such that the limiting frequency is at the most $1/100$ to $1/500$ of the repetition frequency of the synchronising pulses. The sinusoidal oscillation of oscillator 14, which is thus comparatively stable in phase, is supplied by way of an amplitude limiting and threshold device 18 (slicer) to a differentiating network 19, the output circuit of which includes a series-diode and a cross resistance for suppressing pulses of negative polarity. In this case pulses of positive polarity occur in the output circuit of the differentiating network 19 and with a repetition frequency which exactly corresponds to the mean repetition frequency of the incoming synchronising pulses, but which in contradistinction with the latter no longer exhibit time-shift noise.

The pulses freed from noise are used to substitute the incoming signl pulses. For this purpose, the pulses freed from noise are supplied by way of a conductor 20 to a retardation cable 21 having several tapping points, which have connected to them first coincidence mixing stages included in individual receiving channels $A_1$ to $A_5$ inclusive. The receiving channels $A_1$ to $A_5$ are relatively identical. The coincidence mixing stage in channel $A_1$ only is indicated by 22 in the block diagram thereof. The coincidence mixing stage 22 has furthermore supplied to it all incoming pulses occurring at the output of the amplifying stage 11, if desired after being suitably widened. Pulses occur in the output circuit of mixing stage 22 only if an incoming pulse and a substitution pulse derived from retardation cable 21 coincide in mixing stage 22. The incoming pulses, as a result of interference in the transmission path, are relatively different in amplitude, duration and form and also shifted in time of occurrence, whereas the pulses occurring in the output circuit of coincidence mixing stage 22 do not exhibit said transmission errors. Furthermore, by suitable choice of the tapping point on the retardation cable 21, only signal pulses associated with the first signal interval occur in the output circuit of mixing stage 22 in channel $A_1$. During the other signal intervals no substitution pulses are supplied to mixing stage 22 through retardation cable 21, so that mixing stage 22 cannot supply output pulses and hence the means described also distribute the signal pulses over the individual receiving channels $A_1$ to $A_5$.

The signal pulses freed from noise which occur in the output circuit of coincidence mixing stage 22 are supplied by way of a pulse widener 23 to a network 24 integrating signal frequencies, in the output circuit of which the transmitted signal occurs. In order to remove the pulse-repetition frequency and higher harmonics thereof, the output signal of integrating network 24 is supplied by way of a low-pass filter 25 and, if desired, by way of an amplifier to a loudspeaker 26.

In the pulse receiver according to the invention as shown, the pulse selector comprises a coincidence mixing stage 27 which, normally, is cut off and which is controlled by input pulses and furthermore by output pulses of a return circuit which is connected to the output of the mixing stage and which comprises a retarding network 28. It has been found particularly advantageous to connect a pulse producer 29 to the output of retarding network 28, which pulse producer supplies widened pulses to the input circuit of the coincidence mixing stage. The retardation time of retarding network 28 in the embodiment shown is substantially equal to one synchronisation cycle. A separating stage 36 is also provided in the return circuit between retardation line 28 and pulse producer 29, which separating stage will be described hereinafter in connection with the holding circuit.

When the equipment is put into operation, the pulses of amplifying stage 11 are initially supplied by way of a starting switch 30 to the input of return circuit 28, 29 for a duration corresponding to at least one synchronisation cycle. For this purpose, the starting switch 30, by which the coincidence mixing stage 27 for the incoming pulses is shunted is formed as a rest contact 30 of a relay comprising an energising winding 31 which is connected to the output circuit of pulse producer 29. The pulses passed by rest contact 30 reach energising winding 31 after a retardation in network 28 substantially corresponding to one cycle period, thus causing response of the relay 30, 31. Rapid response of relay 30, 31 is particularly advantageous and, in view thereof, use is preferably made of an electronic relay circuit, for example, of the type shown in Fig. 4.

From the moment at which relay 30, 31 responds, the pulses of amplifying stage 11 can reach the return circuit only via coincidence mixing stage 27 and the selection process, which will be explained with reference to the time-diagrams shown in Fig. 2, now starts.

Figure 2:
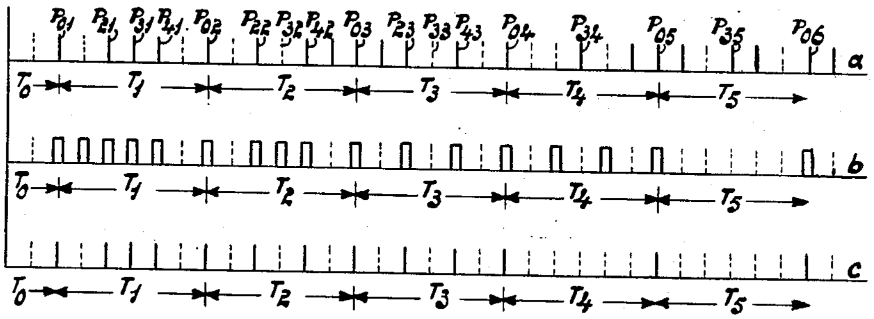
Figs. 2 and 3 show some voltage-time diagrams to explain the operation of the pulse selector shown in Fig. 1.

In the time diagrams shown in Fig. 2, it is assumed that starting switch 30 is opened in a time interval $T_0$ preceding the illustrated cycle periods $T_1$ to $T_5$. The pulses introduced via the starting switch into return circuit 28, 29 provide, after retardation in network 28 and pulse widening in pulse producer 29, input pulses for coincidence mixing stage 27, which exhibit the character as shown, for example, in Fig. 2*b* for the cycle period $T_1$. Whenever a pulse of pulse amplifier 11 as shown in Fig. 2*a*, coincides with a pulse of the return circuit as shown in Fig. 2*b*, coincidence mixing stage 27 supplies an output pulse as illustrated in Fig. 2*c*. In the first cycle period $T_1$, the output pulses of mixing stage 27 correspond to the moments of occurrence of the incoming synchronising pulse $P_{01}$ and the signal pulses $P_{21}$, $P_{31}$ and $P_{41}$.

After retardation in network 28 and pulse widening in pulse producer 29, the said output pulses provide for the second cycle period $T_2$, the input pulses of coincidence mixing stage 27 (vide Fig. 2*b*) which originate from the return circuit and which, together with the pulses of amplifier 11, determine the output pulses of coincidence mixing stage 27. The coincidence mixing stage 27 thus supplies in the cycle period $T_2$ output pulses corresponding to the synchronising pulse $P_{02}$ and the signal pulses $P_{22}$ and $P_{42}$. Consequently, the number of output pulses of the pulse selector is decreased by one with respect to the first cycle period $T_1$.

In the subsequent cycle periods, the selection process described is repeated, the signal pulses $P_{23}$ and $P_{43}$ in addition to the synchronising pulse $P_{03}$ being passed in the cycle period $T_3$, whilst in the fourth and subsequent cycle periods the output pulses of the pulse selector are constituted solely by synchronising pulses $P_{04}$, $P_{05}$ . . . etc.

All time intervals occurring in a duration corresponding to the cycle period are thus tested for synchronising pulses until, as a result of the continuous presence of synchronising pulses, only these pulses are selected from the input pulses. The finding time may thus be reduced to a minimum.

As may be seen from the time diagrams shown in Fig. 2, the use of the pulse producer 29 affords the advantage that the moments of occurrence of the output pulses of coincidence mixing stage 27 are determined solely by the input pulses of the pulse selector and hence independently of the pulses in return circuit 28, 29. There is, in addition, the advantage from a manufacturing point of view that the tolerance conditions for the retarding network 28 may be much less severe.

Figure 3:
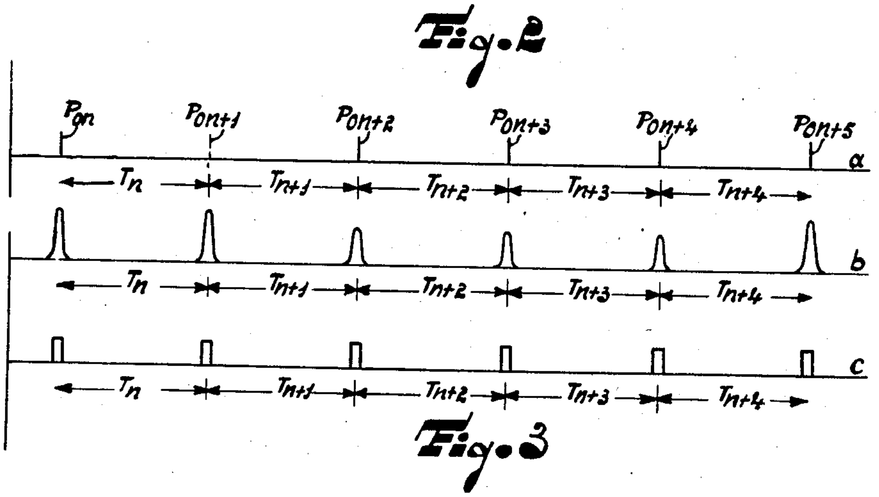

Fig. 3*a* shows, in a time-diagram, the synchronising pulses $P_{0n}$ to $P_{0n+5}$ selected by pulse selector 27—29 for the cycle periods $T_n$, $T_{n+1}$, $T_{n+2}$, $T_{n+3}$, $T_{n+4}$. If, due to disturbance in this series of pulses, a synchronising pulse falls out, for example, pulse $P_{0n+1}$ which is indicated by a dotted line, pulses no longer occur in the return circuit, the relay 30, 31 is deenergised and the described selection process starts again.

In order to increase the holding time of the pulse selector so far described, after the desired selection of synchronising pulses has been carried out, a holding circuit between two points in the return circuit is connected to a retarding network by way of a switch 32. This means that, if one or more subsequent synchronising pulses fall out, the pulse selector still keeps locked on the synchronising pulses.

For this purpose, switch 32 comprises a control circuit which is included in the return circuit and which switches-in the holding circuit when the desired selection is obtained and hence when a pulse occurs in the return circuit during each cycle period (vide Fig. 3*a*). In the embodiment shown, switch 32 is formed as the rest contact of a maximum relay having an energising winding 33 which is connected to pulse producer 29. The maximum relay is not energised if one pulse occurs in the return circuit during each cycle period, but it responds if signal pulses in addition to the synchronising pulses are present in the return circuit. Thus, the relay 32, 33 is energised and the holding circuit is switched off during the selection process in which a plurality of pulses occur in the return circuit per cycle period. If, however, the desired selection of the synchronising pulses occurs, the energising current traversing the winding 33 decreases to below the excitation current of relay 32, 33, so that relay 32, 33 is deenergised and the holding circuit is switched-in, with which the envisaged object is attained. On the contrary, when the holding circuit is switched-in, a position cannot occur in which, in addition to the synchronisation channel, a further channel is engaged.

The holding circuit which is connected to the output of retarding network 28 of the return circuit comprises, in the embodiment shown, a retarding network 34 having an electric length corresponding to twice the cycle period and a centre tap 35. The outputs of the networks 28, 34 and the centre tap 35 are connected for relative decoupling, by way of separating stages 36, to the input of pulse producer 29.

When the holding circuit is switched-in, the input voltage of pulse producer 29 is normally constituted by the sum of three components, that is to say the output pulses of retarding network 28 in the return circuit, the pulses of the output 35′ of retarding network 34 in the holding circuit, and the pulses of centre tap 35. If an output pulse of retarding network 28 falls out, the two pulses of the outputs 35, 35′ of the holding circuit still occur at the input of pulse producer 29. In the two subsequent periods, the input voltage of pulse producer 29 is constituted by the sum of the pulses of return circuit 28 and of the output 35′ of the holding circuit, or by the sum of the pulses of network 28 and of the centre tap 35 of the holding circuit, whereafter the normal operating position is restored. It is thus ensured that the pulse selector keeps locked on the synchronising pulses if one synchronising pulse is absent.

The variations in the input pulses of pulse producer 29 are shown in Fig. 3*b*, the synchronising pulse $P_{0n+1}$ being assumed to be fallen out. Said pulses are rounded and widened by the retarding networks 28 and 34, which in the embodiment described are constituted by a cascade circuit of series inductances and cross condensers. It is evident that the retarding networks 28 and 34 may alternatively be in the form of a tube circuit or the like.

Fig. 3*c* shows the output pulses of the pulse producer, which are substantially identical, as may be seen from the figure. When the holding circuit is switched-in, pulse producer 29 thus affords the advantage that the pulses supplied by way of the return circuit to coincidence mixing stage 27 are not affected in form and amplitude by the falling out of a single synchronising pulse.

In the embodiment of the holding circuit as shown, at the most two successive synchronising pulses can be absent one after the other. If, however, three successive synchronising pulses fall out, the holding circuit does not supply substitution pulses, the coincidence mixing stage 27 does not allow the passage of further pulses and relay 30, 31 is de-energized, whereafter the described selection process is repeated. An increase in holding time may be ensured in a simple manner by an increase in the electrical length of the retardation line 34 with a corresponding increase in the number of tappings.

When the holding circuit is switched-in, it would under very special conditions be possible that the pulse selector, as a result of disturbance, may adjust itself to a signal channel of which the channel pulses are alternately present and absent in successive cycle periods, that is to say, a free channel. The absent pulses of the channel concerned are substituted by pulses of the holding circuit 34, so that a series of pulses of cycle frequency occur at the output of pulse producer 29. An undesirable locked position here ensues, which has the particular feature that the energising currents traversing the windings 31 and 33 of the relays do not vary. This position is noticeable, however, due to the number of output pulses of the coincidence mixing stage decreasing to half the number of synchronising pulses occurring per unit time.

Maintenance of such undesirable positions may be avoided in a particularly simple manner by connecting the energising winding 33′ of an auxiliary relay to the output of the coincidence mixing stage, which winding switches off the holding circuit if the number of output pulses of the coincidence mixing stage is smaller than the number of synchronising pulses occurring per unit time. The winding 33′ may switch off the holding circuit by means of the switch 32. Since upon switching off the holding circuit, the signal pulses which are absent are not replaced by pulses of holding circuit 34, pulses no longer occur in the return circuit, the relay 30, 31 is de-energised and the described selection process starts again.

Figure 4:
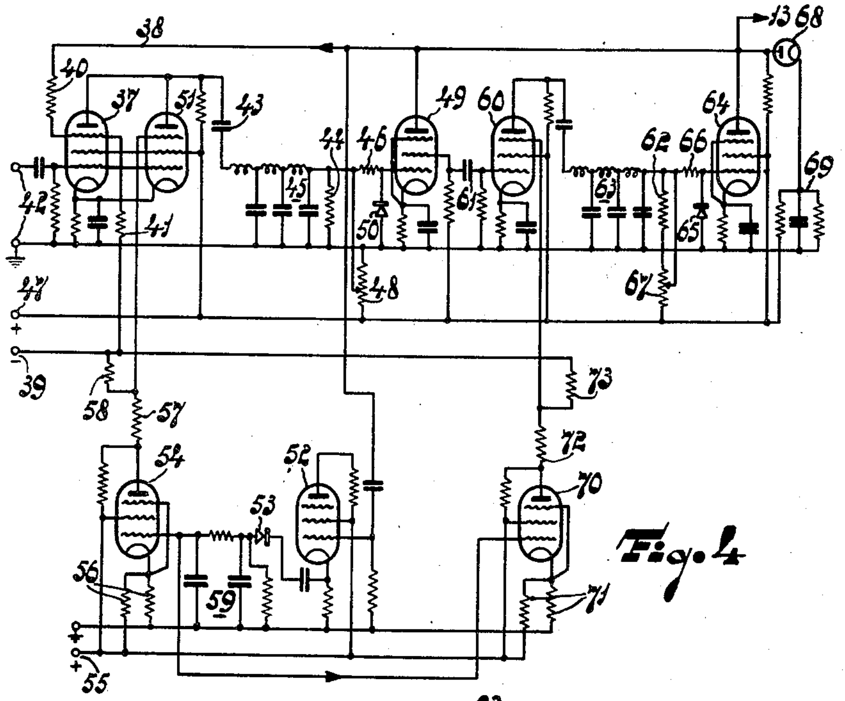
Fig. 4 shows a detail diagram of a pulse selector comprising a holding circuit which is shown in block diagram in the time-multiplex receiver of Fig. 1.

Fig. 4 shows a detail diagram of the pulse selector indicated by 12 in block diagram in Fig. 1.

The pulse selector comprises a coincidence mixing stage which is constituted by a pentode 37 and, normally, is cut off by a negative blocking voltage supplied to the suppressor grid and derived from a voltage divider 40, 41 connected between a conductor 38 of positive voltage and the negative terminal 39 of a grid-tension apparatus. Whenever a pulse of positive polarity originating from input terminals 42 coincides with a pulse supplied by way of conductor 38 to the suppressor grid of pentode 37, the latter supplies a negative voltage pulse which is supplied by way of a blocking condenser 43 to a retardation line 45 which is closed by its surge resistance 44. The retardation time of network 45 in the embodiment shown is equal to one cycle period.

Closing resistance 44 of the retardation line is connected to the control grid of a pentode 49 by way of a series-resistance apparatus 46, which is connected to a tapping point on a voltage divider 48 included between earth and the positive terminal 47 of an anode-tension. The control grid of pentode 49 is earthed by way of a rectifier 50 and thus, normally, conducting. In this circuit the assembly constituted by rectifier 50 and pentode 49 constitutes a threshold- and limiting device for the output pulses of retardation line 45.

Whenever a pulse of negative polarity of retardation line 45 occurs at the control grid of pentode 49, the latter is cut off and a positive voltage pulse occurring at the anode thereof is supplied by way of conductor 38 back to pentode 37. Thus, the selection process described with reference to Fig. 2 occurs in the closed loop constituted by coincidence mixing stage 37, retarding network 45, pulse producer 49, 50 and conductor 38 back to pentode 37.

The coincidence mixing stage 37 may, in this case, be constituted by a triode, a hexode or the like, and furthermore the incoming pulses and the pulses being supplied back may be fed to the same grid of an amplifying tube.

A starting switch provided in parallel with coincidence mixing tube 37 is in the form of a pentode 51 which, together with its control circuit, is realised as an electronic relay circuit. The control circuit of pentode 51 is constituted by the cascade connection of a separating stage in the form of a cathode-follower circuit 52 which is connected to conductor 38, a rectifier 53 having connected thereto an integrating network 59 with a time-constant greater than a duration corresponding to one cycle period, and an amplifying tube 54, which is cut off in the cathode circuit by way of a voltage divider 56 included between earth and the positive terminal 55 of an anode-tension apparatus. The output circuit of amplifying tube 54 is galvanically connected to the suppressor grid of pentode 51 by way of a series-resistance 57, which is connected by way of a resistor 58, to the negative terminal 39 of the grid-bias apparatus.

When the apparatus so far described is switched-in, the pentode 51 fulfills the function of a voltage amplifier, so that all incoming pulses are supplied by way of retardation line 45 and conductor 38 to the control circuit of pentode 51. By rectification and subsequent integration, a direct voltage of positive polarity which varies with the number of pulses occurring in the return circuit per unit-time is set up in the circuit 59 and supplied as a control voltage to amplifying tube 54.

The amplifying tube 54 is released by the positive control voltage, the anode voltage of this tube decreases with a resultant corresponding decrease of the voltage of the suppressor grid of pentode 51, which is active as a switch, and blocking of this tube. It is thus ensured that, reckoned from the first incoming pulse, starting switch 51 is cut off after more than one cycle period, whereafter the selection process described with reference to Fig. 2 may start. The selected synchronising pulses are derived from conductor 38.

In order to increase the holding time of the pulse selector so far described, a holding circuit is connected to the return circuit by means of an electronic switch in the form of a pentode 60, after the desired selection of synchronising pulses is obtained. The positive pulses occurring at the screen grid of pentode 49 are supplied by way of a differentiating network 61 to the control grid of pentode 60, the positive voltage pulses set up at differentiating network 61 being transmitted, after being amplified in pentode 60, to the holding circuit in the switch-in position thereof.

The holding circuit comprises a retarding network 63, which is closed by its surge resistance 62 and which has a retardation time substantially corresponding to one cycle period. The pulses of negative polarity occurring at closing resistance 62 are supplied to the control grid of a pentode 64 which, normally, is conducting and is earthed by way of a rectifier 65 and connected, by way of a series-resistance 66, to a tapping point on a voltage divider 67 included between earth and the positive terminal of anode-tension apparatus 47. The pentode 64 and the rectifier 65 jointly constitute a thershold and limiting device of the type which has already been described in connection with the elements 49, 50.

Whenever a pulse of negative polarity occurs at the control grid of pentode 64, this tube is cut off and a positive pulse occurring in its anode circuit is supplied by way of conductor 38 back to coincidence mixing stage 37.

A limiting diode 68 is connected to conductor 38, in order to ensure that the pulses occurring at the conductor 38 invariably exhibit a constant amplitude. The limiting voltage for the diode 68 is derived from a voltage divider 69 included between earth and the positive terminal 47 of the anode-tension apparatus.

For the control of electronic switch 60 of the holding circuit, use is made of the control circuit for the starting switch which has been described before. For this purpose, the output circuit of integrating network 59 is connected to the control grid of an amplifying tube 70, of which the output circuit is connected to the suppressor grid of pentode 60 by way of a series-resistance 72, which is connected by way of a resistance 73 to the negative terminal of a grid-bias battery 39. The cathode circuit of amplifying tube 70 includes a voltage divider 71 which is connected between earth and the positive terminal 55 and which, normally, would cut off pentode 70. The positive control voltage of integrating network 59 is smaller than the blocking voltage of pentode 70, when the desired selection of the synchronising pulses occurs. If, however, in addition to the synchronising pulses, signal pulses occur in the return circuit, the control voltage is higher than the said blocking voltage. During the selection process in which, in addition to the synchronising pulses, signal pulses occur in the return circuit, the pentode 70 conveys anode current, the electronic switch 60 is cut off and the holding circuit is switched off. On the other hand, when the desired selection of the synchronising pulses occurs, pentode 70 is cut off, the electronic switch 60 is released and the holding circuit is switched-in, whereby the envisaged increase in holding time is obtained.

In the circuit as shown, at the most one synchronising pulse fallen out may be substituted by a pulse of the holding circuit. The pulse selector in this case keeps locked on the synchronising pulses in the manner as has already been described in detail with reference to the time-diagrams shown in Fig. 3. In the circuit here described it is possible under certain conditions that a position may arise in which the pulse selector with the holding circuit switched-in adjusts itself to a signal channel of which the channel pulses may alternately be present and absent in successive cycle periods. Similarly as in the circuit shown in Fig. 1, maintenance of the said undesirable position may here also be avoided by the use of relays having an energising winding which is connected to the output of coincidence mixing stage 37 and which switches off the holding circuit if the said position arises. For this relay circuit use may be made of a relay of the electro-mechanic type.

Figure 5:
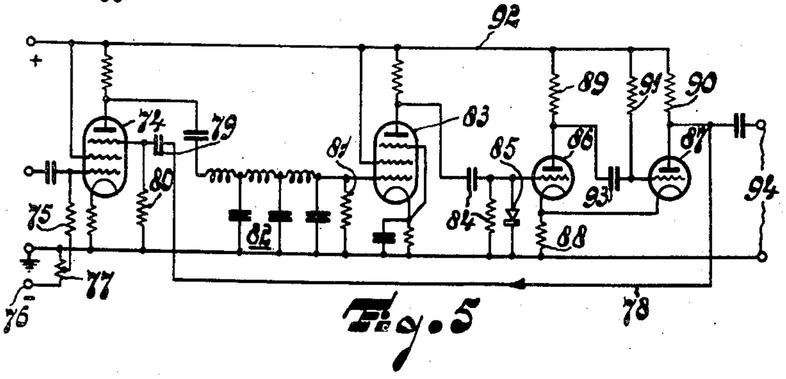
Fig. 5 shows in detail a further embodiment of a pulse selector for a pulse receiver according to the invention.

Fig. 5 shows a detail diagram of a particularly simple pulse selector which may be used in a pulse receiver according to the invention.

In this pulse selector, electrodes of the starting tube also form part of the coincidence mixing tube.

In the embodiment shown, the amplifying tube is constituted by a pentode 74, which is connected as a threshold device for the input pulses of positive polarity in that the control grid is connected by way of a grid-leak resistance 75 to a tapping point on a voltage divider 77, which is included between earth and the negative terminal 76 of a grid-bias apparatus.

When the pulse selector is switched-in, all incoming pulses, after being amplified in pentode 74, are supplied to a return circuit which will be described hereinafter and which comprises the cascade connection of a retarding network having a retardation time of about one cycle period and a pulse regenerator. The amplifying tube 74 thus fulfills the function of a starting tube when the apparatus is switched on.

The retarded output pulses of the return circuit are supplied with positive polarity to conductor 78, which is connected by way of a series condenser 79 and across resistance 80 to the suppressor grid of pentode 74. A negative bias is set up at condenser 79 due to grid detection, so that pentode 74 after a duration of at least one cycle period supplies output pulses only if the input pulses coincide with the pulses supplied back, or in other words, amplifying tube 74 is in this case active as a coincidence mixing stage. From this moment the described selection process starts.

The grid detection may be supported by a rectifier connected in parallel with resistance 80.

Pulses of negative polarity occur at the output circuit of pentode 74, which pulses after being retarded in a retardation line 82 closed by its surge resistance 81 are supplied to the control grid of a pentode 83 circuited as a voltage amplifier. The output circuit of pentode 83 comprises a differentiating network 84 in the form of a series-condenser, the cross resistance being shunted by a rectifying cell 85 which suppresses negative voltage pulses. Whenever a voltage pulse coinciding with the leading edge of the input pulses of pentode 83 occurs at the cross resistance of the differentiating network, said pulses of positive polarity energise a relaxation generator which thus supplies renewed pulses of positive polarity to return conductor 78.

The relaxation generator comprises two triodes 86 and 87 which block one another and which comprise a common cathode resistance 88 and separate anode resistances 89 and 90. The control grid of triode 87 is connected, on the one hand, by way of a grid resistance 91 to an anode voltage lead 92 and, on the other hand, by way of a coupling condenser 93 to the anode of triode 86. Since the control grid of triode 87 has a strong positive bias, of the triode 86 and 87 which, normally, cut off one another, triode 87 will be conducting and triode 86 will be cut off. If in this position a positive voltage pulse from the differentiating network 84, 85 occurs at the control grid of triode 86, the latter becomes conducting and triode 87 is cut off. This position is maintained for a duration determined by the time-constant of the relaxation generator, which is substantially determined by the time-constant of the coupling condenser 93 and the grid resistance 91. After this duration, the relaxation generator returns to its initial position. Positive voltage pulses supplied, on the one hand, to pentode 74, and on the other, to output terminals 94 are thus set up at the output resistance of triode 87.

Figure 6:
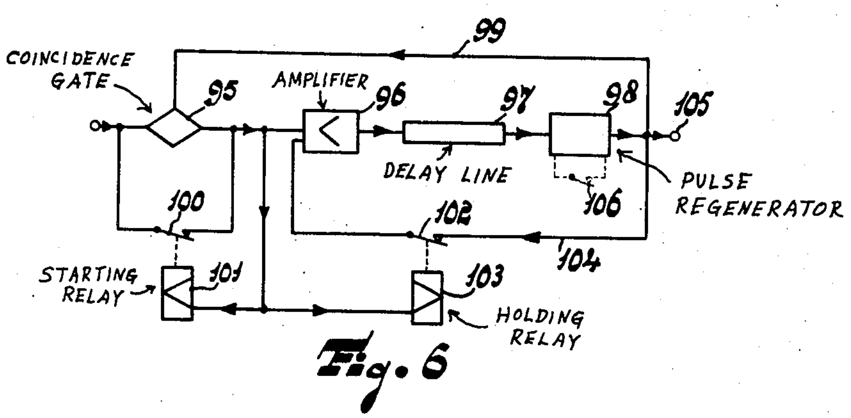
Fig. 6 is a block diagram of a modification of the pulse selector with holding circuit shown in Fig. 1.

Fig. 6 shows in block diagram a modification of the pulse selector which is indicated by 12 in Fig. 1 and which substantially differs from this pulse selector in the construction of its holding circuit.

The pulse selector shown in Fig. 6 comprises the cascade connection of a coincidence mixing stage 95, a voltage amplifier 96, a retardation line 97 and a pulse regenerator 98, which is connected by way of a conductor 99 to an input circuit of coincidence mixing stage 95.

The coincidence mixing stage 95 is shunted by a starting switch in the form of a rest contact 100 of a relay which is controlled by its energising winding 101 in the manner described before.

After the desired selection is obtained, the holding circuit is switched-in under control of a switch 102, which constitutes the rest contact of a relay similarly as in the pulse selector described with reference to Fig. 1. The relay is indicated by 102, 103.

In the embodiment shown, the retarding network of the holding circuit is constituted by the retarding network of the return circuit 97, of which an input is connected by way of a return circuit 104 with an additional small retardation therein to the output of pulse regenerator 98. The output pulses of pulse renewer 98 are thus supplied by way of back-coupling circuit 104 to the input of voltage amplifier 96, substantially at the moments at which the synchronising pulses selected by coincidence mixing stage 95 occur.

The closed loop 96, 98, 97, 104, 102 constitutes a pulse generator which is synchronised by the selected synchronising pulses. If, in the device shown, one or more synchronising pulses fall out, these pulses are replaced by the pulses locally generated in the said pulse generator, so that the pulse selector keeps locked on the synchronising pulses. The selected synchronising pulses are derived from a terminal 105.

In this circuit-arrangement, the use of pulse regenerator 98 affords the advantage that distortion of the pulses in retardation line 97 is thus corrected.

A modification of the holding circuit shown here consists in that, after the desired selection of synchronising pulses is carried out, pulse regenerator 98 itself is converted into a local pulse generator, for example by means of a switch 106 as shown in dotted line.

In the connection of the energising windings of the relays 100, 101 and 102, 103 to the output of coincidence mixing stage 95 as illustrated, an undesirable stable position may occur in an analogous manner as described before with reference to Figs. 1 and 4, which position consists in that the pulse selector holds two free speech channels, in each of which the signal pulses are alternately present and absent in successive cycle periods. In order to prevent this stable position from being maintained, use may be made of a maximum relay having its energising winding connected to conductor 99, which relay switches off the holding circuit when this position arises.

The control circuits 101, 103 may be connected to any arbitrary points of the return circuit. By connecting the control circuits for the starting switch and the switch of the holding circuit to the output of the coincidence mixing stage and the output of the pulse producer in the return circuit respectively, undesirable stable positions may be avoided by suitable proportioning.

It has been found, however, that the connection of the control circuits to the output of the pulse producer such as shown in the embodiments of Figs. 1 and 4 affords practical advantages in connection with the proportioning.

It may be mentioned here that the said undesirable stable positions may be avoided by varying the zero level at the transmitting end in a slow rhythm.

For the sake of simplicity, in the embodiments shown, the starting point is always constituted by a return circuit having a retardation corresponding to one cycle period. However, it is alternatively possible to choose the retardation of the return circuit to correspond to a whole multiple of a cycle period. However the use of a return circuit having a retardation time corresponding to one cycle period affords the advantage that the starting switch can introduce into the return circuit at the most the maximum number of pulses occurring in one cycle period, which implies that a minimum scanning time is obtained.

The pulse receiver according to the invention is not limited to the reception of signals transmitted by pulse code-modulation. This pulse receiver may also be used with advantage for the reception of signals transmitted by pulses of different repetition frequencies, for example, in a Loran-beacon receiver, in which pulses of a determined repetition frequency are selected by the pulse selector.

What we claim is:

1. A synchronizing-pulse selector for separating synchronizing pulses occurring with a predetermined repetition frequency and signal pulses which are present and absent in an alternating manner dependent upon a sigal being transmitted, comprising a coincidence mixing stage having a control terminal and an output terminal, a source of synchronizing and signal pulses connected to said control terminal of said mixing stage, a return circuit including a signal retarding network having an output connector and connected between said output terminal and a control terminal of said mixing stage, and means including a starting circuit to supply signal pulses and synchronizing pulses to said return circuit.

2. The pulse selector in accordance with claim 1, in which said retarding network has a retardation time substantially equal to one cycle of said repetition frequency.

3. The pulse selector in accordance with claim 1, in which said retarding network has a retardation time substantially equal to a whole multiple of one cycle of said repetition frequency.

4. The pulse selector in accordance with claim 1, in which said return circuit includes a pulse producer connected between said retarding network and said last-named control terminal.

5. The pulse selector in accordance with claim 1, in which said starting circuit comprises a starting tube having a control grid connected electrically to said source of pulses and an anode connected to the output terminal of said mixing stage, and in which said starting circuit also comprises a control circuit connected between said return circuit and a control electrode of said starting tube.

6. The pulse selector in accordance with claim 5, in which said mixing stage comprises a mixer tube having a control grid connected to receive said pulses, an anode connected to said output terminal, and a cathode, and in which said starting tube includes a cathode; said cathodes, anodes and control grids being respectively connected together, whereby said starting tube and said mixer tube are connected in parallel with respect to said pulses.

7. The pulse selector in accordance with claim 5, in which the connection of said control circuit to said return circuit is at said connection of said return circuit to said control terminal.

8. The pulse selector in accordance with claim 1, including a separator stage connected in series with respect to said return circuit, a holding circuit comprising a second retarding network and an actuating relay switch therefor and connected in shunt across said separator stage, and relay energizing means connected to energize said relay in accordance with pulses in said return circuit.

9. The pulse selector in accordance with claim 8, in which said second retarding network comprises an artificial cable having a plurality of taps thereon, a plurality of separating amplifiers respectively connected between said taps and a common output point, the retardation time of said cable between successive taps being equal to one cycle of the repetition frequency of the pulses to be selected, said holding circuit being connected electrically between said output connector of said signal retarding network and said last-named control terminal.

10. The pulse selector in accordance with claim 8, in which said holding circuit includes a local pulse generator, and means for synchronizing said local pulse generator with the selected pulses.

11. The pulse selector in accordance with claim 8, in which said relay switch and said starting circuit each comprise an electronic relay, each said electronic relay having a switching electrode and a control circuit having a time-constant greater than one cycle of the repetition frequency of the pulses to be selected.

12. The pulse selector in accordance with claim 11, in which each said control circuit comprises an integrating network connected to receive pulses from said retarding network and produce a control voltage which varies in accordance with the number of received pulses per unit time, and means connecting said control voltages to the respective said switching electrodes.

13. The pulse selector in accordance with claim 12, including a pair of voltage threshold devices connected in each said control circuit, said threshold devices having different threshold voltages smaller and greater, respectively, than the value of said control voltage at the occurrence of the desired selection of the synchronizing pulses.

14. The pulse selector in accordance with claim 13, including an auxiliary relay having an energizing winding connected to the output terminal of said coincidence mixing stage and having a switch connected to turn off said holding circuit if the number of output pulses of said coincidence mixing stage occurring per unit-time is smaller than the number of synchronizing pulses occurring per unit-time.

15. A synchronizing-pulse selector for separating synchronizing pulses occurring with a predetermined repetition frequency and signal pulses which are present and absent in an alternating manner dependent upon a signal being transmitted, comprising a source of said synchronizing and signal pulses, a coincidence mixing stage having two input terminals and an output terminal, means connecting said source of pulses to one of said input terminals, a retardation line, means connecting an end of said retardation line to said output terminal, a pulse regenerator having an input terminal connected to the other end of said retardation line and an output terminal connected to the remaining input terminal of said mixing stage, means including a starting circuit connected to supply signal pulses and synchronizing pulses to said retardation line, a holding circuit, and means connecting said holding circuit between the output terminal of said pulse regenerator and the first-mentioned end of said retardation line.

16. The pulse selector in accordance with claim 15, in which said starting switch and said means connecting said holding circuit each comprises an electronic relay having a control circuit connected to the output terminal of said coincidence mixing stage and having a time-constant greater than one cycle of the repetition frequency of the pulses to be selected.

17. The pulse selector in accordance with claim 16, in which each said control circuit comprises an integrating network connected to receive pulses from said retarding network and produce a control voltage which varies in accordance with the number of received pulses per unit-time, and means connecting said control voltages to the respective said switching electrodes.

18. The pulse selector in accordance with claim 17, including a pair of voltage threshold devices connected in each said control circuit, said threshold devices having different threshold voltages smaller and greater, respectively, than the value of said control voltage at the occurrence of the desired selection of the synchronizing pulses.

19. The pulse selector in accordance with claim 18, including an auxiliary relay having an energizing winding connected to the output terminal of said coincidence mixing stage and having a switch connected to turn off said holding circuit if the number of output pulses of said coincidence mixing stage occurring per unit-time is smaller than the number of synchronizing pulses occurring per unit-time.

References Cited in the file of this patent

UNITED STATES PATENTS

| | | |
|---|---|---|
| 2,416,308 | Grieg | Feb. 25, 1947 |
| 2,419,570 | Labin | Apr. 29, 1947 |
| 2,438,928 | Labin | Apr. 6, 1948 |
| 2,490,039 | Earp | Dec. 6, 1949 |
| 2,517,618 | Young | Aug. 8, 1950 |
| 2,568,319 | Christensen | Sept. 18, 1951 |